US006379630B1

(12) United States Patent
Wilfong et al.

(10) Patent No.: US 6,379,630 B1
(45) Date of Patent: Apr. 30, 2002

(54) SALT GRID FOR WATER SOFTENING SYSTEM BRINE TANK

(75) Inventors: Rudy B. Wilfong, Fort Wayne; Alan B. Channell, Columbia City, both of IN (US)

(73) Assignee: Chemical Engineering Corporation, Churubusco, IN (US)

( * ) Notice: Subject to any disclaimer, the term of this patent is extended or adjusted under 35 U.S.C. 154(b) by 0 days.

(21) Appl. No.: 09/414,108

(22) Filed: Oct. 7, 1999

Related U.S. Application Data

(60) Provisional application No. 60/106,003, filed on Oct. 28, 1998.

(51) Int. Cl.[7] .......................... B01D 11/02; B01D 24/46; A47B 9/00; F16M 11/24; B65D 81/24
(52) U.S. Cl. ...................... 422/264; 422/300; 422/311; 422/902; 210/191; 210/498; 108/144.11; 248/188.2; 206/209.1; 220/4.13; 220/484; 220/565
(58) Field of Search ............................ 422/6, 122, 255, 422/261–268, 274–279, 283, 311, 292, 239, 902; 210/190–191, 498; 108/188.2, 188.8, 188.9, 144.11; 248/188.2; 206/209, 209.1; 220/4.13, 484, 565

(56) References Cited

U.S. PATENT DOCUMENTS

| | | | |
|---|---|---|---|
| 1,063,707 A | * 6/1913 | Lummus | |
| 1,500,096 A | 7/1924 | Oxley ........................ 423/208 |
| 1,736,890 A | 11/1929 | Sweeney | |
| 2,536,934 A | * 1/1951 | Hinrichs ....................... 23/272 |
| 2,551,494 A | * 5/1951 | Kaufmann ..................... 23/272 |
| 2,803,528 A | * 8/1957 | Erdmann .................... 23/270.5 |
| 2,934,411 A | 4/1960 | Purse ........................... 23/288 |
| 2,985,514 A | * 5/1961 | Lundeen ....................... 23/272 |
| 3,073,674 A | * 1/1963 | Rudelick ....................... 23/112 |
| 3,080,975 A | 3/1963 | Rose ........................... 210/134 |
| 3,233,732 A | 2/1966 | Lung et al. .................. 210/138 |
| 3,342,338 A | 9/1967 | Selmeczi et al. ............ 210/191 |
| 3,374,891 A | 3/1968 | Buchmann ................... 210/126 |
| 3,502,442 A | * 3/1970 | Campbell et al. .......... 23/272.6 |
| 3,732,165 A | * 5/1973 | Campbell .................... 210/190 |
| 3,751,233 A | * 8/1973 | Tischler ........................ 23/272 |
| 4,219,413 A | 8/1980 | Jackson et al. ................ 210/25 |
| 4,235,340 A | * 11/1980 | Clack et al. ................. 206/515 |
| 4,260,487 A | 4/1981 | Gruett ......................... 210/190 |
| 5,310,488 A | 5/1994 | Hansen et al. .............. 210/674 |
| 5,411,717 A | * 5/1995 | Piddicord et al. ........... 422/275 |
| 5,643,541 A | 7/1997 | Peddicord .................... 422/275 |
| 5,788,933 A | 8/1998 | Peddicord .................... 422/275 |
| 6,119,989 A | * 9/2000 | Hollington et al. ....... 248/188.2 |

* cited by examiner

Primary Examiner—Robert J. Warden, Sr.
Assistant Examiner—Monzer R. Chorbaji
(74) Attorney, Agent, or Firm—Baker & Daniels

(57) ABSTRACT

A salt grid for supporting salt above a portion of a concentrated brine solution in a brine tank for use in a water softening system. The grid comprises first and second platforms disposed at first and second elevational levels with respect to the vertical wall of the brine tank. The fluid level in the brine tank can be adjusted to be higher than the lower platform of the salt grid but lower than the upper platform of the salt grid. In this manner, salt dissolves only above the lower platform part of the grid and consequently, the dirt included in the salt only passes through the lower platform of the grid. The brine well which transports brine solution from the brine tank to the resin tank is located away from the localized area in which the dirt collects at the bottom of the brine tank. Leg extension members may be attached to the supporting legs of the salt grid to further raise the salt grid above the bottom of the brine tank, thereby increasing the volume of brine solution which forms below the salt grid.

21 Claims, 4 Drawing Sheets

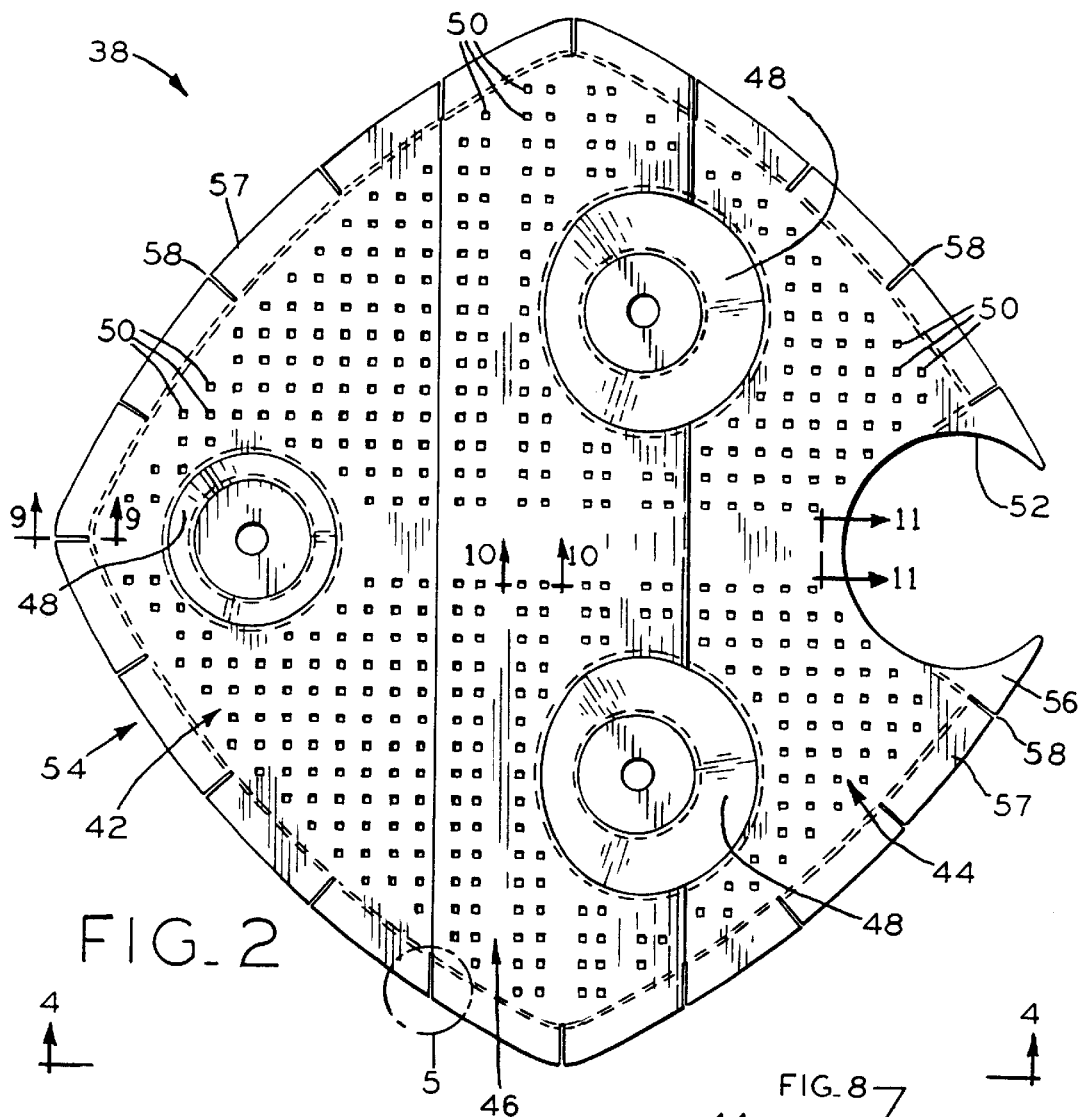
FIG_2
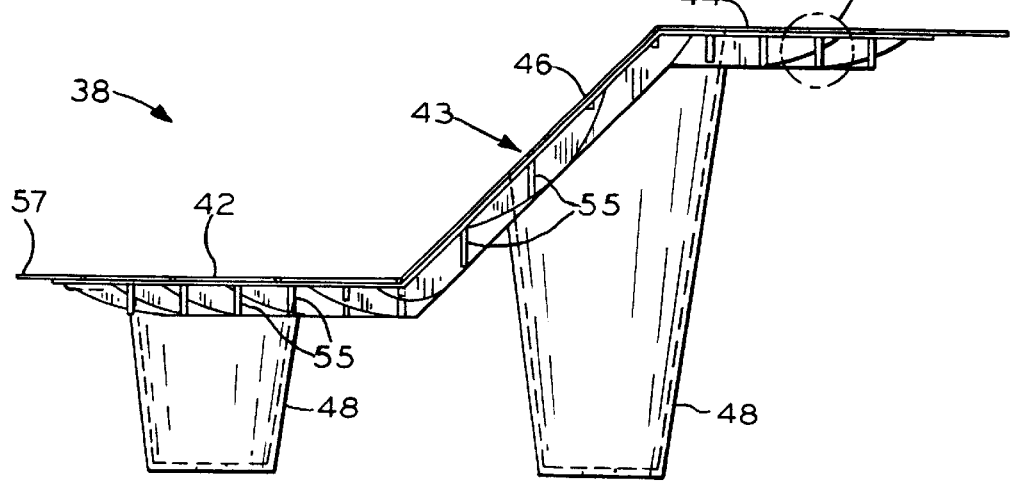
FIG_3

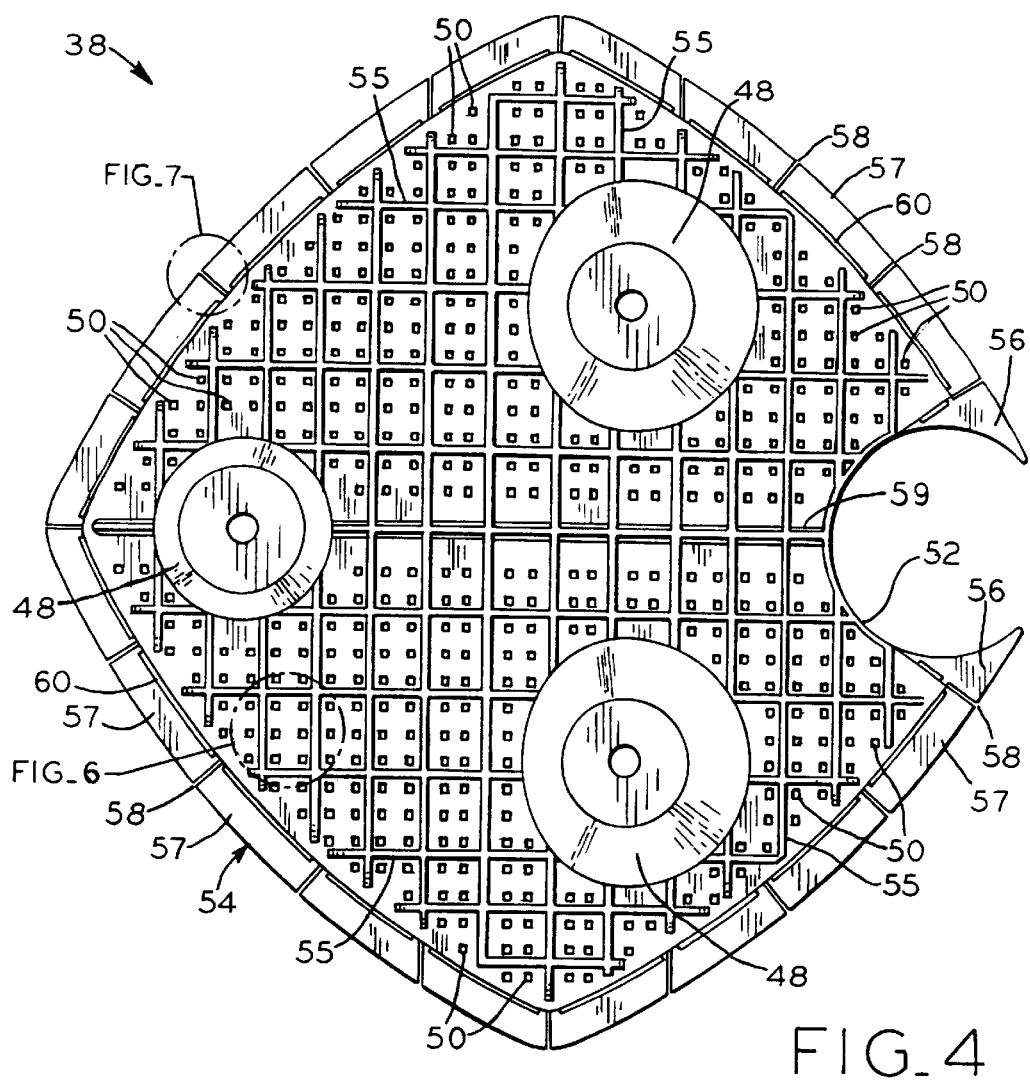
FIG_4
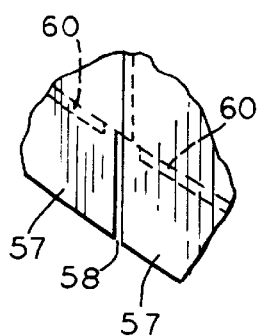
FIG_5
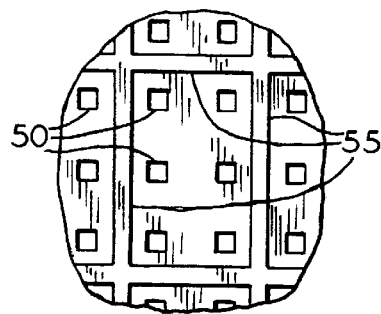
FIG_6
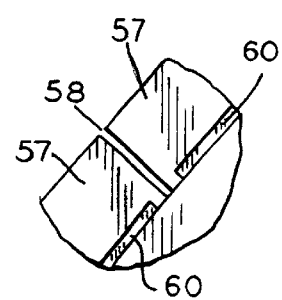
FIG_7

SALT GRID FOR WATER SOFTENING SYSTEM BRINE TANK

This application claims the benefit under Title 35, U.S.C. § 119(e) of U.S. Provisional Patent Application Serial No. 60/106,003, entitled IMPROVED SALT GRID FOR BRINE TANK AND WATER SOFTENING SYSTEM, filed on Oct. 28, 1998.

BACKGROUND OF THE INVENTION

The present invention relates generally to water softeners and more specifically to a salt grid placed within a brine tank in a water softening system.

Water softening systems are well known and typically involve a pressurized water treatment device in which hard water is passed through a bed of cation exchange media (either inorganic or synthetic organic) for the purpose of exchanging calcium and magnesium ions for sodium or potassium ions, thus producing a softened water which is more desirable for laundering, bathing and dish washing. Water softeners typically consist of a resin tank containing an ion exchange material such as zeolite or resin beads.

Water softening capacity must be regenerated at intervals depending on the hardness of the water and the capacity of the softener. Regeneration of the water softener is typically accomplished by flushing brine (common salt solution) through the exchange material to replace collected calcium and magnesium ions with sodium ions. The brine solution is provided from a brine tank and, after flushing through the resin tank, the flush brine waste is disposed of properly.

Brine tanks are typically constructed large enough to hold a large volume of salt so that the water softening system may undergo many regeneration cycles without having to replenish the salt in the brine tank. At least a portion of the salt contained in the brine tank is in contact with water which causes the salt to dissolve and form the saturated brine solution which collects at the bottom of the brine tank. It is undesirable for any salt crystals or pellets to be transmitted with the brine solution to the ion exchange medium. It has thus been common and known in the art to provide a "salt grid" to support the granular salt at a fixed level above the bottom of the brine tank, but below the top level of the brine solution in the brine tank. The salt grid typically contains openings therein which allow dissolved salt to pass therethrough but prevent passage of solid crystals or pellets. In this manner, a saturated brine solution develops below the grid without any significant amount of undissolved salt being transmitted with the saturated brine solution when the brine solution is drawn from the bottom of the brine tank through the brine well.

Many different salt grids are commercially available. Some designs involve salt grids having multiple parts which require assembly before installation in the brine tank. Other arrangements involve unitary, or one-piece salt grids which can be installed directly into the brine tank. One known salt grid design allows nesting of multiple salt grids for convenient low volume shipping.

One problem with known salt grids is that dirt included with the salt passes therethrough and settles at the bottom of the brine tank. In turn, when saturated brine is drawn into the brine well the dirt is drawn therewith and may plug the brine well, close off the entrance to the brine well, plug control components such as injectors, and may foul the resin in the resin tank. As a result, the brine well cannot properly draw the saturated brine from the bottom of the tank, thereby limiting or entirely preventing regeneration of the resin. Therefore, once a substantial amount of dirt accumulates at the bottom of the brine tank, the brine tank must be cleaned, which is a tedious and undesirable task.

An additional problem with known salt grids is that they allow only a single volume of saturated brine to form in the brine tank below the salt grid, and this amount of brine solution may not be varied by the user when regenerating the resin tank. This is due to the fact that known salt grids support salt only at a single, fixed location above the bottom of the brine tank.

It is desirable to provide a salt grid for a brine tank which addresses the problem of dirt accumulation at the bottom of the brine tank, allows less frequent cleaning of the brine tank, and allows a lower quality (higher dirt content) salt to be used in the brine tank without requiring more frequent cleaning thereof.

It is further desirable to provide a salt grid that allows the user to vary the water level relative to the salt grid and to vary the position of the salt grid relative to the bottom of the brine tank in order to adjust the volume of saturated brine that forms in the brine tank below the salt grid.

SUMMARY OF THE INVENTION

The present invention is a salt grid having an upper surface of varying height which allows dirt passing through the salt grid to be collected in a localized area in the bottom of the brine tank. The brine well, which transfers brine solution from the brine tank to the resin tank, is positioned so that it draws saturated brine at a location spaced away from the localized area where dirt collects at the bottom of the brine tank. The present invention also provides leg extensions which may be affixed to the supporting legs of the salt grid to further raise the salt grid relative to the bottom of the brine tank to facilitate the formation of a greater volume of saturated brine in the brine tank below the salt grid.

In one form thereof, the present invention is a salt grid for supporting salt above at least a portion of the saturated brine solution in the brine tank. The salt grid comprises first and second platforms which are disposed at first and second elevational levels, respectively within the brine tank. The platforms provide a surface which supports the salt which is used to create the saturated brine solution. At least one of the platforms includes openings therein for permitting dissolved salt to flow therethrough, thereby increasing the concentration of the brine in the solution and forming a saturated brine. The first and second platforms are connected to one another and together they define an outer periphery of the grid. The grid spans an interior area of the brine tank defined by the inner walls of the brine tank. That is, the outer periphery of the grid contacts the inner walls of the brine tank providing a barrier for the salt. Integral legs depend from the first and second platforms to support the salt grid above the bottom of the brine tank.

The water level within the brine tank can thus be selected so that the water engages the salt supported on the lower platform, but not the salt supported on the upper platform. As salt dissolves and dissolved salt passes through the openings and into the saturated brine solution, dirt passes into the brine solution as well. However, the dirt settles in a localized area beneath that portion of the grid which is engaged by the water, typically on one side of the brine tank. The brine well is then placed on the opposite side of the brine tank so that when saturated brine is drawn therefrom, the dirt is not drawn therewith.

In another form thereof, the present invention is a salt grid having integral legs depending from the underside of the first and second platforms as described above. Leg extensions are attached to the integral legs, where the leg extensions support the salt grid and raise the salt grid a further distance from the bottom of the brine tank, allowing a larger volume of saturated brine to form in the brine tank beneath the salt grid.

Various configurations of the multi-level grid of the present invention are envisioned, the basic principle being that the water, or brine below the grid will engage the grid at a location away from the brine valve tube so that dirt drawn from the brine tank with the brine solution is minimized. One configuration of a salt grid in accordance with the present invention includes two generally planar, horizontally disposed platforms and a third sloping platform disposed therebetween, connecting the first and second platforms.

One advantage of such an arrangement is that the water level below the grid may be adjusted to accommodate higher salt settings (i.e. larger volume of brine below the salt grid). For example, the volume of brine solution below the salt grid may be increased because of the available space existing below the upper platform of the grid. By contrast, prior art salt grids offer no room to adjust the brine level.

Another advantage of the present invention is that leg extensions may be attached to the integral salt grid legs to further raise the salt grid from the bottom of the brine tank, allowing a larger volume of brine solution to form below the salt grid and therefore accommodating a higher salt setting.

A further advantage of the present invention is that it reduces the intervals between which the brine tank must be cleaned. By providing a salt grid which deposits the dirt contained in the salt in a localized area at the bottom of the brine tank, a larger volume of saturated brine solution can be drawn from the brine tank without the brine well becoming plugged with dirt. It has been found that a significant increase in the amount of dirt accumulated in the bottom of the tank can be allowed if the dirt is contained in a localized area as is provided by the present invention.

Still another advantage of the present invention is that the third sloping platform of the salt grid helps prevent "bridging." Bridging is an undesirable phenomenon in which salt positioned above the salt grid develops a hard, cement-like consistency so that further dissolution of salt through the grid is prevented. Bridging typically occurs when the salt stagnates above the grid. The salt grid of the present invention reduces bridging because salt is encouraged to slide down the sloping surface of the salt grid of the present invention due to gravitational forces. In this manner, the salt grid of the present invention encourages more movement of the salt supported by the salt grid, which in turn avoids the bridging effect.

Yet another advantage of the present invention is that it allows an inexpensive salt (higher dirt content) to be used without requiring increased cleaning of the brine tank vis-à-vis prior art brine tanks. This is so because the salt grid of the present invention causes the dirt to be collected in a localized area and therefore allows a larger quantity of dirt to be collected between cleanings of the brine tank.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 2 is a top plan view of the salt grid;

FIG. 3 is an elevational view of the salt grid of FIG. 2;

FIG. 4 is a bottom plan view of the salt grid;

FIG. 5 is an enlarged fragmentary view of a section of the periphery of the salt grid of FIG. 2;

FIG. 6 is an enlarged fragmentary view of a section of the bottom of the salt grid of FIG. 4, illustrating the spacing of the openings in the salt grid;

FIG. 7 is an enlarged fragmentary view of a section of the periphery of the salt grid of FIG. 4;

Figure 1:
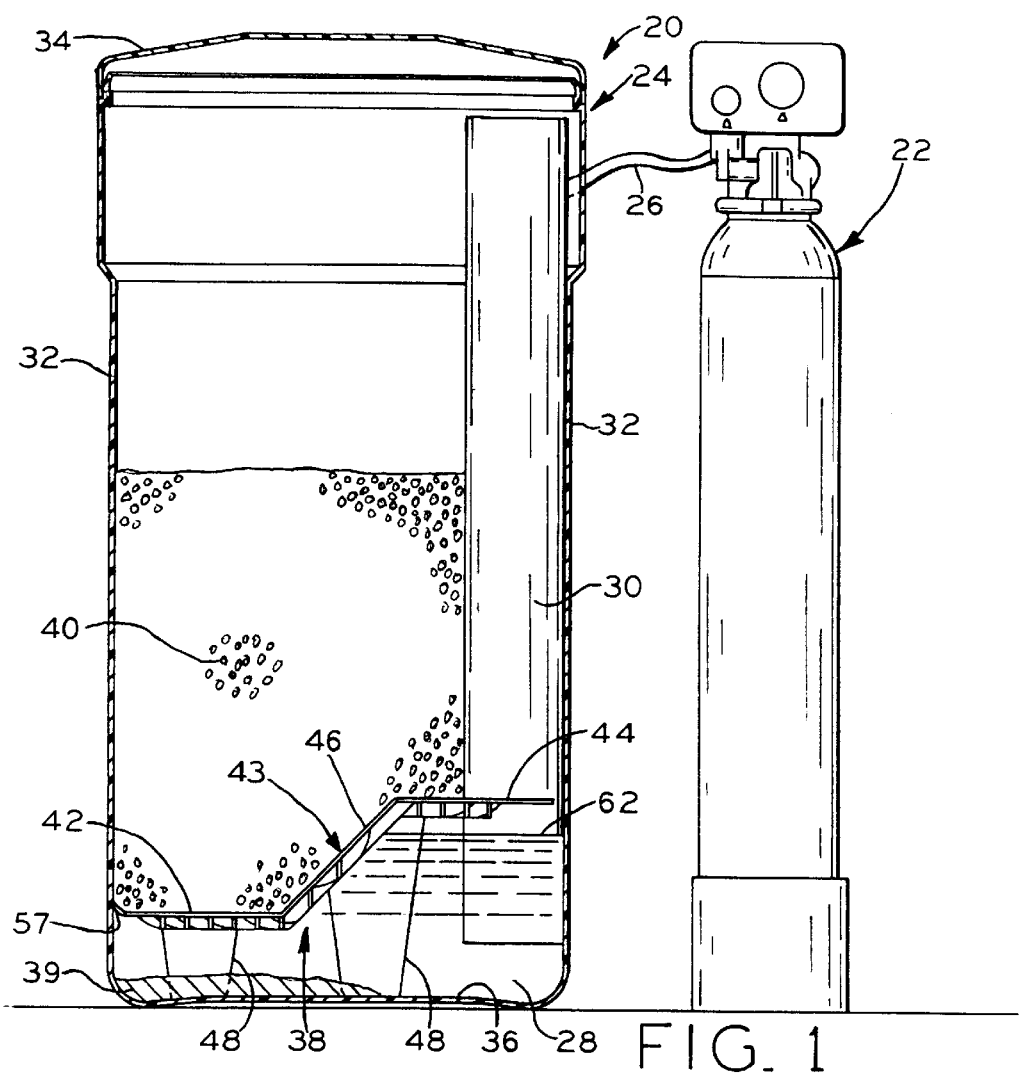
FIG. 1 is a longitudinal sectional view of a resin tank and a brine tank including a salt grid in accordance with one form of present invention.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates an embodiment of the invention, in one form, and such exemplification is not to be construed as limiting the scope of the invention in any manner.

DETAILED DESCRIPTION

The embodiment disclosed below is not intended to be exhaustive or limit the invention to the precise form disclosed in the following detailed description.

With reference to FIG. 1, water softening system 20 includes a resin tank 22 which typically includes an ion exchange medium such as zeolite or resin beads. Brine tank 24 is fluidly connected to resin tank 22 through conduit 26, thereby providing a conduit from brine tank 24 to resin tank 22. At periodic intervals, the ion exchange medium in resin tank 22 is "regenerated" by treating thereof with saturated brine solution 28 stored in the bottom of brine tank 24. Brine solution 28 is transported through conduit 26, which is disposed within and extends substantially to the bottom of brine well 30. Conduit 26 feeds brine solution 28 into resin tank 22 whereupon the sodium ions contained in the saturated brine solution 28 are exchanged for the calcium and magnesium ions contained in resin tank 22. The flush brine is then disposed of and resin tank 22 is again ready to treat hard water.

Brine tank 24 is comprised of brine tank side walls 32, removable cover 34, and bottom 36. Brine well 30 is substantially vertically disposed on the right side of brine tank 24 as shown in FIG. 1. As shown in FIG. 1, the lower end of brine well 30 is spaced apart from bottom 36 of brine tank 24 so that saturated brine solution 28 may flow into the bottom end of brine well 30.

Salt grid 38 in accordance with one form of the present invention can be seen at the lower portion of brine tank 24 in FIG. 1 and in more detail in FIGS. 1A, 2, 3 and 4. Salt grid 38 may be integrally formed, and supports pelletized, granular, or solar salt thereon. It is to be understood that the salt grid of the present invention can be used with all types of commercially available salt for use in water softeners. As shown in the figures, salt grid 38 includes platform 42 which is substantially planar and horizontally disposed within brine tank 24. Platform 44 is also substantially planar and horizontally disposed in brine tank 24, but at a higher elevational level than platform 42. A third platform 46 is a generally sloping or inclined surface disposed intermediate platforms 42 and 44 and connects platforms 42 and 44. As shown in the figures, and in particularly FIGS. 1A and 3, platform 42 and platform 46 define an angle of approximately 135° therebetween. However, the angle defined between platforms 42 and 46 can vary substantially. While the illustrated embodiment depicts an arrangement of three platforms 42, 44, and 46, where platforms 42 and 44 are disposed at two levels, it is to be understood that other configurations comprising four or more platforms disposed at three or more levels are also possible. Generally, upper surface 43 of platforms 42, 44 and 46 of grid 38 is of varying height with respect to brine tank 24.

As seen in FIG. 1, salt grid 38 is supported above bottom 36 of brine tank 24 by legs 48 depending downwardly from salt grid 38. In the illustrated embodiment shown in FIG. 1A, legs 48 are of a frusto-conical shape and are integrally formed with salt grid 38. Further, legs 48 are preferably hollow to facilitate stacking, or nesting, of a quantity of salt grids 38.

Figure 1A:
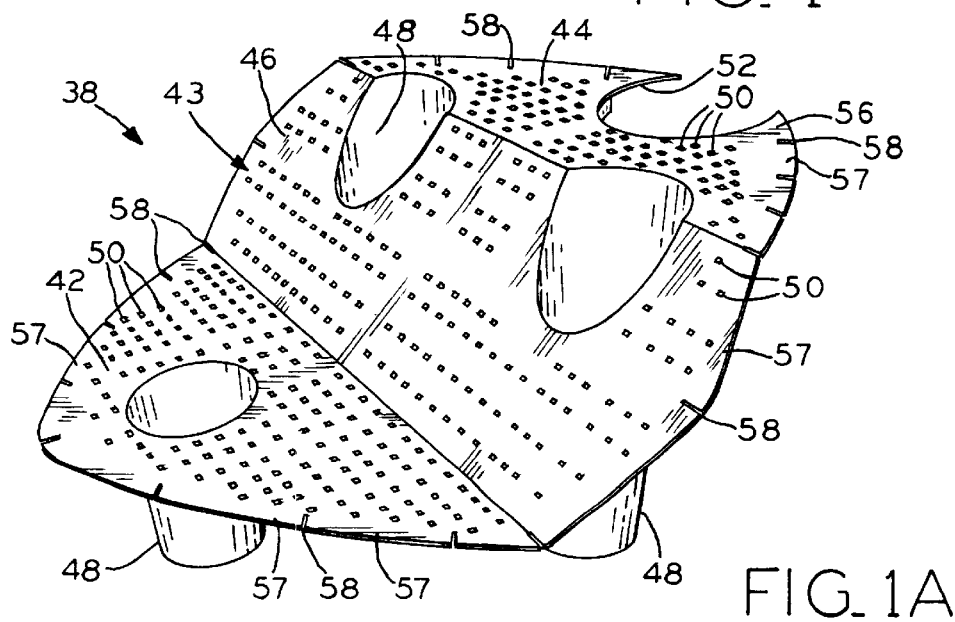
FIG. 1A is a perspective view of the salt grid.

As shown in detail in FIGS. 1A and 2, salt grid 38 may be of various shapes in order to accommodate differently shaped brine tanks. Generally, salt grid 38 is dimensioned for spanning an interior area of brine tank 24, defined by side walls 32 of brine tank 24. Salt grid 38 is shown in FIG. 2 as a generally square structure with rounded peripheries 54. A plurality of openings 50 are included in salt grid 38 so that brine concentrate passes therethrough and sinks to the bottom of brine tank 24. However, openings 50 are sized such that wetted but undissolved salt is prevented from passing through openings 50. As shown in FIG. 6, openings 50 in the exemplary embodiment comprise square apertures having ⅛ inch sides spaced 0.300 inches apart. It has been found that such sizing and spacing permits concentrated brine to flow through openings 50 but wetted or solid salt is prevented from passing through openings 50. Thus, upper surface 43 of salt grid 38 forms a barrier below which undissolved salt is substantially prevented from passing.

Figure 8:
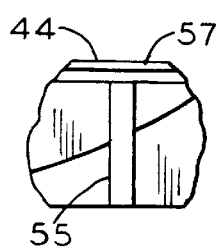
FIG. 8 is an enlarged fragmentary view of a section of the top platform of the salt grid shown in FIG. 3.
Figure 11:
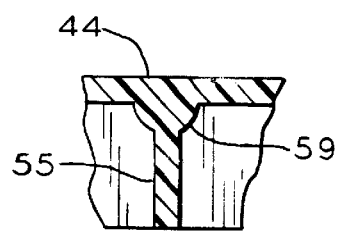
FIG. 11 is a fragmentary sectional view taken along lines 11—11 of FIG. 2.

As shown in FIGS. 2 and 4, platform 44 defines a generally cylindrical aperture 52 located near the outer periphery 54 of grid salt 38. Aperture 52 is sized to receive therethrough the substantially cylindrical brine well 30 as shown in FIG. 1. Flexible ears 56 shown in FIGS. 2 and 4 facilitate the placement of aperture 52 around brine well 30. Salt grid 38 also includes integrally formed reinforcing ribs 55 in parallel and perpendicular intersecting relationship to one another as shown in FIGS. 4, 8 and 11. Runner section 59 is shown in FIGS. 4 and 11, formed integral with platforms 42, 44, 46 and reinforcing ribs 55, disposed beneath and bisecting platforms 42, 44 and 46.

Figure 9:
FIG. 9 is a fragmentary sectional view taken along lines 9—9 of FIG. 2.

Outer periphery 54 shown in FIGS. 2 and 4 is comprised of a plurality of flexible flaps 57 separated from one another by notches 58. As shown in FIGS. 5, 7 and 9, each flap 57 includes thin portion 60, the thickness of which facilitates the upward and downward bending of flap 57. Because flaps 57 are flexible, salt grid 38 of the present invention can accommodate structural imperfections and aberrations in side walls 32 of brine tank 24. The edges of flaps 57 engage side walls 32 of brine tank 24 thereby preventing passage of wetted or particulate salt to the bottom 36 of brine tank 24.

The operation of salt grid 38 of the present invention can be understood with reference to FIG. 1. During everyday use of water softening system 20, resin tank 22 processes several gallons of hard water therethrough. The magnesium and calcium ions in the hard water are exchanged for sodium ions in the ion exchanger located within resin tank 22 thereby reducing the hardness of the water. Meanwhile, salt 40 stored in brine tank 24 dissolves to form concentrated brine solution 28 at the bottom of brine tank 24. Specifically, as shown in FIG. 1, fluid level 62 is set so that salt stored on the left side of the brine tank is submerged beneath fluid level 62. In this manner, the salt is dissolved in the water and passes through openings 50 in salt grid 38 and forms saturated brine solution 28 at the bottom of brine tank 24.

Significantly, when fluid level 62 is set as shown in FIG. 1, salt grid 38 provides for dissolution of salt on only the left side of brine tank 24 because the fluid level on the right side of brine tank 24 is actually below upper platform 44. Thus, the multilevel, or varying height upper surface 43 of salt grid 38 is partially above fluid level 62 and partially below fluid level 62. The portion of salt 40 positioned on the right side of brine tank 24, because it is above fluid level 62, does not dissolve. By contrast, the portion of salt 40 positioned on the left side of brine tank 24, because it is below fluid level 62, tends to dissolve and pass through openings 50.

Figure 10:
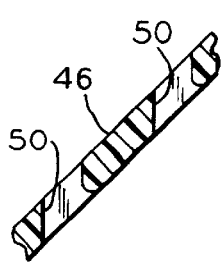
FIG. 10 is a fragmentary sectional view taken along lines 10—10 of FIG. 2.

It may now be seen in FIG. 1 that water level 62 may be adjusted to a variety of levels such that water level 62 engages platform 42 yet remains below platform 44. This adjustment is facilitated by the vertical distance between platform 42 and platform 44 of upper surface 43. As water level 62 is increased, it will engage a greater portion of upper surface 43, which contains openings 50 for dissolved salt to pass therethrough, as shown in FIG. 10.

Generally, commercially available salt contains a certain percentage of dirt mixed in the salt. As salt 40 dissolves in brine tank 24, the particulate dirt 39 becomes free and is able to pass through openings 50 in salt grid 38, thereby settling on bottom 36 of brine tank 24. As shown in FIG. 1 and described above, the dissolution of salt 40 occurs on the left side of brine tank 24 and thus dirt 39 passing through salt grid 38 all passes therethrough on the left side of brine tank 24. As a result, dirt 39 is deposited into a localized area on the left side on bottom 36 of brine tank 24. Brine well 30, which draws saturated brine solution 28 from brine tank 24 and transports it into resin tank 22 during regeneration, is disposed on the right-hand side of brine tank 24. Because dirt 39 contained in salt 40 accumulates in a localized area on the left side on bottom 36 of brine tank 24 and brine solution 28 is drawn from the right-hand side of tank 24, the amount of dirt 39 drawn from brine tank 24 along with saturated brine solution 28 is greatly reduced.

It can now be understood that the novel salt grid 38 provides the advantage of keeping the dirt 39 which accumulates on the bottom 36 of brine tank 24 a maximum distance away from the area in which saturated brine solution 28 is drawn from brine tank 24. In so doing, more dirt 39 can accumulate on the bottom 36 of brine tank 24 without requiring the cleaning out of brine tank 24. Furthermore, a lower cost salt 40 containing a higher percentage of dirt 39 can be used with the present invention as compared to prior art brine tanks. The salt grid 38 of the present invention also allows for the design of more narrow brine tanks 24, which in turn permits usage in more confined spaces.

It can also be appreciated that salt grid 38 reduces the tendency of salt 40 to "bridge." Generally, bridging is a phenomenon which occurs when salt stagnates above a salt grid and forms a hard, cement-like layer, thereby preventing further passage of salt through the salt grid. As shown in FIG. 1, water level 62 is positioned below salt 40 being supported on upper platform 44. As the portion of salt 40 positioned below water level 62 (on the left in FIG. 1) dissolves, a portion of salt 40 on the right hand side tends to slide down sloping platform 46. Thus, salt grid 38 of the present invention creates movement of the salt thereabove, which in turn prevents bridging.

Figure 12:
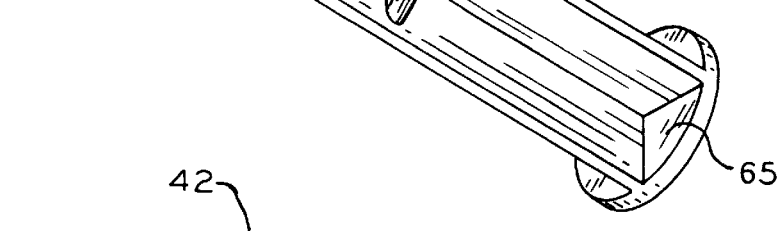
FIG. 12 is a perspective view of a salt grid leg extension.
Figure 13:
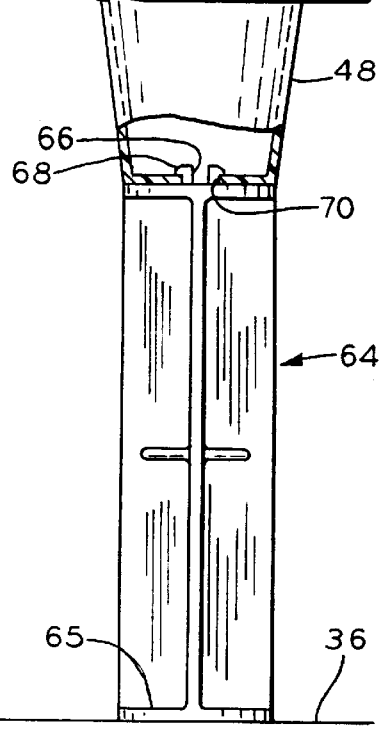
FIG. 13 is a side view of a portion of the salt grid, showing a salt grid leg extension attached to one of the salt grid legs.

As shown in FIGS. 12 and 13, leg extensions 64 may be attached to legs 48 of grid 38 in order to accommodate a greater volume of saturated brine solution to form below grid 38. Leg extensions 64 may comprise a single piece of integrally molded material, and include integral feet 65 for supporting grid 38 on bottom 36 of brine tank 24. The length of leg extensions 64 may be varied substantially, allowing grid 38 to be raised to a variety of levels within brine tank 24 to increase the volume of saturated brine solution 28 in brine tank 24.

In the exemplary embodiment, leg extensions 64 may include integral attachment protrusions 66 with nubs 68. To attach leg extensions 64 to legs 48, protrusions 66 are inserted into apertures 70 formed in the bottom of legs 48. Protrusions 66 flex inwardly until nubs 68 pass through apertures 70, at which point protrusions 66 return to their original positions, thereby "snap locking" leg extensions 64 into place below legs 48.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A salt grid disposed in a brine tank, said salt grid being adapted to support salt in said brine tank, said brine tank having a bottom wall, side walls, and a conduit adapted to be connected to a resin tank, said salt grid comprising:
   first and second platforms adapted for supporting salt thereon, said first platform disposed at a first elevational level and said second platform disposed at a second elevational level higher than said first elevational level within the brine tank, said first and second platforms connected to each other, said grid spanning an interior area of said brine tank defined by the side walls of said brine tank, said second platform being located proximate said conduit and said first platform being located at a position in said brine tank that is opposite said conduit; and
   at least said first platform having openings therein for permitting flow therethrough of brine formed by the dissolution of the salt.

2. The salt grid of claim 1, wherein each of said first and second platforms includes a substantially planar upper surface disposed substantially horizontally with respect to the side walls of the brine tank.

3. The salt grid of claim 2, wherein said second platform includes an opening located near a periphery of said salt grid, said opening adapted to receive therethrough a brine well for drawing brine from the brine tank beneath said second platform.

4. The salt grid of claim 1, further including a third platform connecting said first and second platforms and being inclined relative to said first and second platforms.

5. The salt grid of claim 4, wherein said third platform includes openings therein for permitting flow therethrough of brine.

6. The salt grid of claim 1, further comprising a plurality of supporting legs depending downwardly, said plurality of supporting legs adapted to support said salt grid at a first position above the bottom of the brine tank.

7. The salt grid of claim 6, further comprising a plurality of leg extension members, each said leg extension member attached to a respective one of said plurality of supporting legs to support said salt grid at a second position higher than said first position.

8. The salt grid of claim 1, further comprising a plurality of integral, spaced apart support ribs depending downwardly from said first and said second platforms.

9. The salt grid of claim 1, wherein said salt grid is integrally formed.

10. In combination:
   a brine tank in a water softening system, said brine tank having side walls and a conduit connected to a resin tank in the water softening system and adapted for storing salt therein; and
   a salt grid disposed within said brine tank and adapted to support salt thereon, said salt grid spanning an interior area of said brine tank defined by said side walls of said brine tank, said salt grid further including:
      first and second platforms connected to each other, said first platform disposed at a first elevational level and said second platform disposed at a second elevational level higher than said first elevational level, said second platform located proximate said conduit and said first platform located at a position in said brine tank that is opposite said conduit; and
      at least said first platform having openings therein for permitting the flow therethrough of brine formed by the dissolution of salt.

11. The combination of claim 10, wherein each of said first and second platforms includes a substantially planar upper surface disposed substantially horizontally with respect to said side walls of said brine tank.

12. The combination of claim 11, wherein said second platform contains an opening therein located near a periphery of said salt grid.

13. The combination of claim 12, wherein said brine tank includes a brine well substantially vertically disposed therein through said opening in said second platform, said brine well adapted for drawing brine from said brine tank beneath said second platform.

14. The combination of claim 10, wherein said salt grid includes a plurality of flexible flaps disposed around the periphery of said salt grid and engaging said side walls of said brine tank.

15. A brine tank for use in a water softening system, said brine tank comprising:
   a conduit adapted to be connected to a resin tank in the water softening system;
   a salt grid for supporting salt in said brine tank, including a substantially horizontal upper platform with an aperture therein and located proximate said conduit, and a substantially horizontal lower platform connected to said upper platform and located at a position in said brine tank that is opposite said conduit, said grid spanning an interior area of said brine tank;
   a brine well disposed within said aperture of said upper platform for drawing brine from said brine tank beneath said upper platform; and at least said lower platform having openings therein for permitting flow therethrough of brine formed by the dissolution of salt.

16. The brine tank of claim 15, wherein said upper and lower platforms of said salt grid are connected by a sloping surface with respect to said upper and lower platforms.

17. In combination:
   a brine tank used in a water softening system and having side walls, said brine tank being adapted for storing salt therein; and
   a salt grid for supporting salt disposed in said brine tank, said salt grid dimensioned for spanning an interior area of said brine tank defined by said side walls of said brine tank, said salt grid comprising:
      a platform having openings therein for permitting flow therethrough of brine formed by the dissolution of salt supported on said platform;
      a plurality of supporting legs depending downwardly from said platform; and
   a plurality of leg extension members, each leg extension member of said plurality of leg extension members attached to a respective one of said plurality of supporting legs, whereby said plurality of leg extension members support said platform at a higher elevational level than the elevational level at which said platform would be supported by said plurality of legs.

18. The combination of claim 17, wherein each leg extension member of said plurality of leg extension members includes an integral foot portion defining a substantially horizontal lower surface of said leg extension member.

19. The combination of claim 17, wherein each supporting leg of said plurality of supporting legs includes a bottom surface having an aperture therein.

20. The combination of claim 19, wherein each leg extension member of said plurality of leg extension members includes at least one protrusion for locking insertion into said aperture in a respective one of said plurality of supporting legs.

21. The combination of claim 20, wherein said leg extension members are snap locked to respective said supporting legs.

* * * * *